US011443609B2

(12) United States Patent
Ball

(10) Patent No.: US 11,443,609 B2
(45) Date of Patent: Sep. 13, 2022

(54) SECURITY SYSTEM

(71) Applicant: BCD Technologies Corporation, Willow Grove, PA (US)

(72) Inventor: Michael Robert Ball, Willow Grove, PA (US)

(73) Assignee: BCD Technologies Corporation, Willow Grove, PA (US)

( * ) Notice: Subject to any disclaimer, the term of this patent is extended or adjusted under 35 U.S.C. 154(b) by 0 days.

(21) Appl. No.: 17/482,511

(22) Filed: Sep. 23, 2021

(65) Prior Publication Data

US 2022/0028239 A1 Jan. 27, 2022

Related U.S. Application Data

(63) Continuation of application No. 17/435,544, filed as application No. PCT/US2020/021134 on Mar. 5, 2020.

(Continued)

(51) Int. Cl.
*G10L 17/00* (2013.01)
*G08B 21/04* (2006.01)
(Continued)

(52) U.S. Cl.
CPC ............ *G08B 21/043* (2013.01); *G01P 15/00* (2013.01); *G06F 21/32* (2013.01); *G10L 15/08* (2013.01);
(Continued)

(58) Field of Classification Search
CPC ..... G10L 21/0208; G10L 25/84; G10L 25/93; G10L 17/00; G10L 15/22; G10L 17/24;
(Continued)

(56) References Cited

U.S. PATENT DOCUMENTS 8,004,399 B2    8/2011   Reyes et al.
8,441,356 B1    5/2013   Tedesco et al.
(Continued)

FOREIGN PATENT DOCUMENTS

KR        10-1798535 B1     11/2017

OTHER PUBLICATIONS

International Search Report and Written Opinion for corresponding International application No. PCT/US2020/021134; dated Jun. 29, 2020 (13 pages).

*Primary Examiner* — Jakieda R Jackson
(74) *Attorney, Agent, or Firm* — Mendelsohn Dunleavy, P.C.

(57) ABSTRACT

An electronic device including: a processor, a SIM card, one or more sensors, and a memory. The processor may:
analyze words or phrases spoken by one or more trusted user(s) using voice recognition;
determine if the one or more trusted user(s) has spoken a wake word,
activate the one or more sensors to collect data when it has been determined the wake word has been spoken;
determine location and temporal data for the electronic device from the SIM card;
continue to analyze words or phrases spoken by one or more trusted user(s) using voice recognition;
determine if one or more trigger words has been spoken; and
activate the one or more response measure(s) if it is determined that a trigger word has been spoken. Also described is a security system and a method for carrying out a predetermined response as a result of spoken wake and trigger words.

16 Claims, 11 Drawing Sheets

Elaborate VAS system with a master, multiple slaves and a gateway

Simple VAS system master and one slave

Related U.S. Application Data

(60) Provisional application No. 62/815,988, filed on Mar. 8, 2019.

(51) Int. Cl.
| | | |
|---|---|---|
| *G06F 21/32* | (2013.01) | |
| *G10L 15/08* | (2006.01) | |
| *H04W 12/63* | (2021.01) | |
| *H04W 12/68* | (2021.01) | |
| *G01P 15/00* | (2006.01) | |
| *G10L 17/24* | (2013.01) | |
| *G10L 21/0208* | (2013.01) | |
| *H04L 9/40* | (2022.01) | |
| *H04R 1/40* | (2006.01) | |

(52) U.S. Cl.
CPC .............. *G10L 17/00* (2013.01); *G10L 17/24* (2013.01); *G10L 21/0208* (2013.01); *H04L 63/0861* (2013.01); *H04R 1/406* (2013.01); *H04W 12/63* (2021.01); *H04W 12/68* (2021.01); *G10L 2015/088* (2013.01)

(58) Field of Classification Search
CPC ............. G06F 21/32; G06F 2221/2113; G06F 21/575; G06F 15/08; H04W 12/06; H04W 12/68; H04W 12/63; G08B 21/043; G08B 25/08
See application file for complete search history.

(56) References Cited

U.S. PATENT DOCUMENTS

| | | | |
|---|---|---|---|
| 9,349,366 B2 | 5/2016 | Giancarlo et al. | |
| 9,704,377 B2 | 7/2017 | Benoit et al. | |
| 9,876,788 B1 * | 1/2018 | Ziraknejad | G06F 21/32 |
| 10,325,596 B1 * | 6/2019 | Tran | G10L 15/30 |
| 10,581,825 B2 * | 3/2020 | Poschel | H04L 63/08 |
| 10,726,830 B1 * | 7/2020 | Mandal | G10L 15/16 |
| 11,043,086 B1 * | 6/2021 | Daoura | H04R 3/04 |
| 11,062,700 B1 * | 7/2021 | Azimi | G06F 16/288 |
| 2003/0037004 A1 * | 2/2003 | Buffum | G07C 9/37 |
| | | | 705/51 |
| 2004/0038664 A1 | 2/2004 | Stoks | |
| 2005/0176402 A1 | 8/2005 | Verloop et al. | |
| 2007/0167147 A1 | 7/2007 | Krasner et al. | |
| 2011/0181422 A1 | 7/2011 | Tran | |
| 2012/0096095 A1 | 4/2012 | Bhargava | |
| 2013/0252571 A1 | 9/2013 | Lee | |
| 2014/0129235 A1 * | 5/2014 | Suvanto | G10L 21/06 |
| | | | 704/276 |
| 2014/0136195 A1 * | 5/2014 | Abdossalami | H04M 3/2236 |
| | | | 704/235 |
| 2014/0208389 A1 * | 7/2014 | Kelley | H04L 63/08 |
| | | | 726/4 |
| 2014/0253326 A1 | 9/2014 | Cho et al. | |
| 2017/0357637 A1 * | 12/2017 | Nell | H04L 12/2823 |
| 2018/0060269 A1 * | 3/2018 | Kessler | G06F 13/4022 |
| 2018/0211665 A1 * | 7/2018 | Park | G06F 3/167 |
| 2018/0260680 A1 * | 9/2018 | Finkelstein | G10L 15/22 |
| 2018/0308480 A1 * | 10/2018 | Jang | G06F 3/167 |
| 2018/0310159 A1 * | 10/2018 | Katz | H04M 3/4217 |
| 2018/0336352 A1 * | 11/2018 | Dooley | G06F 21/575 |
| 2019/0020686 A1 * | 1/2019 | Cohen | H04L 41/0893 |
| 2019/0073999 A1 * | 3/2019 | Premont | G10L 15/08 |
| 2019/0149987 A1 * | 5/2019 | Moore | G06F 3/167 |
| | | | 726/9 |
| 2019/0173446 A1 * | 6/2019 | Knode | H03G 3/32 |
| 2019/0179438 A1 * | 6/2019 | Benkley, III | G06F 3/0416 |
| 2019/0339927 A1 * | 11/2019 | Gosu | H04N 21/42203 |
| 2019/0386981 A1 * | 12/2019 | Ramesh Kumar | H04L 9/3228 |
| 2020/0162496 A1 * | 5/2020 | Medalion | H04L 63/1416 |

* cited by examiner

```
┌─────────────────────────────────────────────┐
│  Analyzing words or phrases spoken by a trusted │
│        user using voice recognition          │
└─────────────────────────────────────────────┘
                      ▼
┌─────────────────────────────────────────────┐
│  Listening for a trusted user to speak the wake │
│    word, where the wake word turns on the    │
│              electronic device               │
└─────────────────────────────────────────────┘
                      ▼
┌─────────────────────────────────────────────┐
│    Collecting data via the one or more sensors   │
└─────────────────────────────────────────────┘
                      ▼
┌─────────────────────────────────────────────┐
│  Listening for a trusted user to speak the trigger │
│   word, where the trigger word indicates that the  │
│    trusted user is in an emergency situation   │
└─────────────────────────────────────────────┘
                      ▼
┌─────────────────────────────────────────────┐
│   Activate a predetermined response measure on   │
│   the electronic device if the user has spoken the │
│                 trigger word.                │
└─────────────────────────────────────────────┘
```

Figure 1

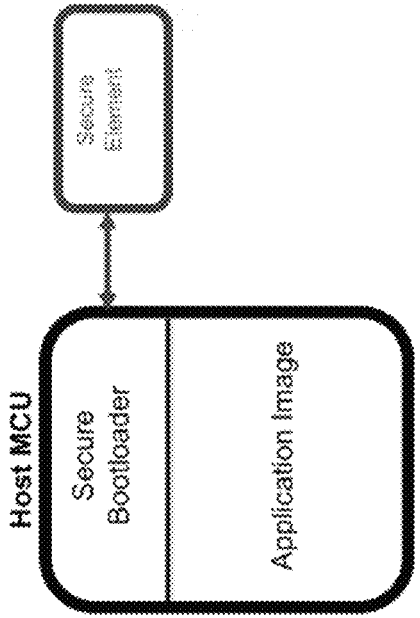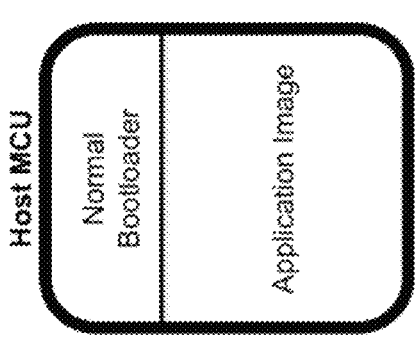
Figure 13

SECURITY SYSTEM

CROSS-REFERENCE TO RELATED APPLICATIONS

This application is a continuation of U.S. patent application Ser. No. 17/435,544, filed on Sep. 1, 2021, which, in turn is a 371 continuation of PCT application no. PCT/US2020/021134, filed on Mar. 5, 2020, which, in turn, claims the benefit of U.S. provisional application No. 62/815,988, filed on Mar. 8, 2019, the disclosures of which are hereby incorporated by reference in their entirety.

FIELD OF THE INVENTION

The present invention relates to fixed electronic devices and security systems comprising the electronic devices capable of monitoring, detecting, and providing notification and response measures to respond to various emergency situations regarding one or more users.

BACKGROUND OF THE INVENTION

According to the FBI Crime Clock, a murder occurs every 30.5 minutes, a rape every 3.9 minutes, a robbery every 1.7 minutes and aggravated assault every 39 minutes. Additionally, a fire occurs in a US home every 1.5 minutes. In situations where seconds can be critical, availability, ease of notification and speed of communications are the vital determinants of a fast response to an emergency.

Available product solutions on the market fail to address issues such as the unavailability of a panic button or other means of notification for the person in distress, inaccurate location of the person in distress, dispatching the wrong responder to the scene (sending police when EMT should be sent), the inability to effectively communicate the nature of the emergency (e.g. language barrier). These and other shortcomings compound the level of personal danger.

For colleges, hotels, and other institutions, in particular, the incidence of sexual assaults on their premises' have them struggling to find a better way to protect the people for whom they are responsible. This highlights a significant need for faster and easier notification and response. New Jersey has recently passed legislation to address this issue in the hospitality industry and other states will soon follow.

Currently available systems require cloud-based infrastructure for functionality which limits the use and potential capabilities of their security systems. Specifically, these cloud-based systems are inefficient as they are required to be paired with a mobile device, which is then used to call the emergency responders and/or third parties.

U.S. Pat. No. 9,349,366 relates to system and methods for managing an emergency situation capable of monitoring, detecting, and providing notification and/or response measures in response to an emergency situation regarding a user.

SUMMARY AND TERMS OF THE INVENTION

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

In a first aspect, the present invention relates to an electronic device, including:
 a processor;
 a SIM card;
 one or more sensors;
 a memory for storing logic for execution by the processor to:
  analyze words or phrases spoken by one or more trusted user(s) using voice recognition;
  determine from the analyzed words or phrases if the one or more trusted user(s) has spoken a wake word,
  activate the one or more sensors to collect auditory, visual, and/or bio-metric data received by the one or more sensors of the electronic device when it has been determined that one said trusted user has spoken the wake word;
  determine location and temporal data from the SIM card;
  continue to analyze words or phrases spoken by one or more trusted user(s) using voice recognition;
  determine if one said trusted user has spoken one or more trigger words from the analyzed words or phrases; and
  activate the one or more response measure(s) if it is determined that one said trusted user has spoken one said trigger word.

In the foregoing embodiment, the memory may be configured to store personal information of each of the one or more trusted users and one or more of said response measures includes accessing and transmitting at least some of said stored personal information of the trusted user that uttered the trigger word.

In each of the foregoing embodiments, the personal information may include one or more of medical history, names, ages, addresses, information about pets, name and age of children or parents of one or more trusted users, number of people in a building where the electronic device is located.

In each of the foregoing embodiments, the temporal data may be selected from the time of the day or the day of the week.

In each of the foregoing embodiments, the one or more predetermined response measures comprises contacting a third party, wherein the third party may be selected from, the police, the fire department, a friend or relative, a registered neighbor, and combinations thereof.

In each of the foregoing embodiments, the one or more predetermined response measures may further comprise streaming and/or transmitting some or all of the collected auditory, visual, and/or bio-metric data, location, temporal data, and the personal information of the one or more users.

In each of the foregoing embodiments, the electronic device may be configured to connect to a network via Bluetooth, a wireless network, a wired network, voice over internet protocol (VoIP), and the Internet.

In each of the foregoing embodiments, the electronic device may be configured to be a stationary device.

In each of the foregoing embodiments, the one or more sensors may comprise sensors selected from a microphone, a camera, a light sensor, a GPS sensor, a gyroscope, an accelerometer, and a motion detector.

In each of the foregoing embodiments, the one or more sensors may comprise at least 3 microphones.

In a second aspect, the present invention relates to security system comprising: a master device including,
 one or more processors,
 a cellular modem or one or more non-cellular radios, or combinations thereof a SIM card,
a GPS chip,
one or more sensors, and
one or more of electronic devices, each said electronic device including: one or more sensors;
a memory for storing logic for execution by the processor to:
  analyze words or phrases spoken by one or more trusted user(s) using voice recognition;
  determine from the analyzed words or phrases if the one or more trusted user(s) has spoken a wake word,
  activate the one or more sensors to collect auditory, visual, and/or bio-metric data received by the one or more sensors of the electronic device when it has been determined that one said trusted user has spoken the wake word;
  continue to analyze words or phrases spoken by one or more trusted user(s) using voice recognition;
  determine if one said trusted user has spoken one or more trigger words from the analyzed words or phrases; and
  communicate with the master device to activate one or more response measure(s) if it is determined that one said trusted user has spoken one said trigger word,
wherein the one or more electronic devices are configured as slave electronic devices to the master device and each of the one or more electronic devices are in bidirectional communication with the master device.

In the foregoing embodiment, the one or more processors may comprise a main processor, a secured authentication and recognition processor, a speech processor, and an audio processor.

In each of the security system embodiments, the master device may be configured to be a mobile device and the one or more sensors comprises an accelerometer.

In each of the security system embodiments, the system may comprise at least three or more slave electronic devices and further comprises a gateway in communication with the master device and each of the at least three or more slave electronic devices.

In each of the security system embodiments, the system further comprises a secured cryptographic processor, In each of the security system embodiments, wherein the one or more sensors of the master device is a far field capable microphone.

In a third aspect, the present invention relates to a method for activating a response measure using a security system, wherein the security system comprises:
  a processor;
  a SIM card;
  one or more sensors;
  a memory for storing logic for execution by the processor to perform the method, said method comprising steps of:
    analyzing words or phrases spoken by one or more trusted user(s) using voice recognition;
    determining from the analyzed words or phrases if the one said trusted user has spoken a wake word;
    activating the one or more sensors to collect auditory and/or visual data received by the one or more sensors when it has been determined that one said trusted user has spoken the wake word;
    determining location and temporal data for a component of the system using the SIM card;
    continuing to analyze words or phrases spoken by one or more trusted user(s) using voice recognition;
    determining if one said trusted user has spoken one or more trigger words from the analyzed words or phrases; and
    activating the one or more response measure(s) if it is determined that one said trusted user has spoken one said trigger word.

In the foregoing embodiment, the memory may be configured to store personal information of each of the one or more trusted users and one or more of said response measures includes a step of accessing and transmitting at least some of said stored personal information of the trusted user that uttered the trigger word.

In each of the method embodiments, the one or more predetermined response measures may comprise contacting a third party, wherein the third party may be selected from, the police, the fire department, a friend or relative, a registered neighbor, and combinations thereof.

In each of the method embodiments, the one or more predetermined response measures may further comprise streaming and/or transmitting the collected auditory, visual, bio-metric data, location, temporal data, and the personal information of the one or more users.

In each of the method embodiments, the processor to connects to a network via Bluetooth, a wireless network, a wired network or the Internet.

In each of the method embodiments, the one or more sensors may be selected from a microphone, a camera, a light sensor, a GPS sensor, a gyroscope, an accelerometer, and a motion detector.

In each of the method embodiments, the one or more sensors may comprise at least 3 microphones and the method further includes a step of auditory noise reduction.

The following definitions of terms are provided in order to clarify the meaning of certain terms as used herein.

MQTT—Message Queuing Telemetry Transport.

mBedTLS—An implementation of the Transport Layer Security (TLS) and Secure Sockets Layer (SSL) protocols and the respective cryptographic algorithms and support code required.

lwIP—Lightweight IP.

OPUS codec—Lossy audio coding format designed to efficiently code speech and general audio in a single format, while remaining low-latency enough for real-time interactive communication and low-complexity enough for low-end embedded processors.

MP3 codec—Coding format for digital audio.

G.711—An ITU telecommunication Standardization Sector (ITU-T) standing for audio compounding, titled Pulse code modulation (PMC) of voice frequencies.

WMA—Windows Media Audio.

IDC—Integrated/Internal Data Controller.

ML Inference Engine—Machine Learning Inference Engine

FreeRTOS—Real-time operating system kernel for embedded devices.

BLE—Bluetooth Low Energy.

BT—Bluetooth.

DMA—Direct Memory Access.

XIP—XIP allows for a digital signature to be applied and verified on the receiving system before the archive is expanded.

PDM—Pulse-Density Modulation.

SAI—Secured Audio Input/Interface

PCM—Pulse-Code Modulation.

AFE—Audio Front End.

CRC—Cyclic Redundancy Check.

SHA-2—Secure Hash Algorithm 2.

ECDSA—Elliptic Curve Digital Signature Algorithm.

OEM—Original Equipment Manufacturer.

VAS—Voice Activated System.

Mfg—Manufacturing
$K_{PRIV}$—Key Private
$K_{PUB}$—Key Public
NB-IoT—Narrowband-Internet of Things.
LAI—Location Area Identity.
TLS—Transport Layer Security.
API—Application Programming Interface.
SD card—Secure Digital card.
OTA—Over the Air.
OTW—Over the Wire.
MSD—Mass Storage Device.
MCU—Microcontroller Update.
SW1/SW2—Switch or Input.
HAB—High Assurance Boot.
ASR—Automatic Speech Recognition.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

FIG. 1 shows a flowchart of an exemplary method for activating a response measure on an individual electronic unit.

FIG. 13 shows the difference between a standard and a secure bootloader.

DETAILED DESCRIPTION OF THE PREFERRED EMBODIMENTS

Figure 2:
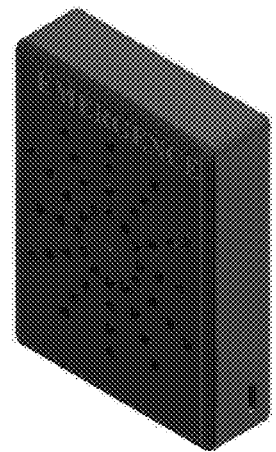
FIG. 2 shows an exemplary electronic device as a mobile unit.
Figure 3:
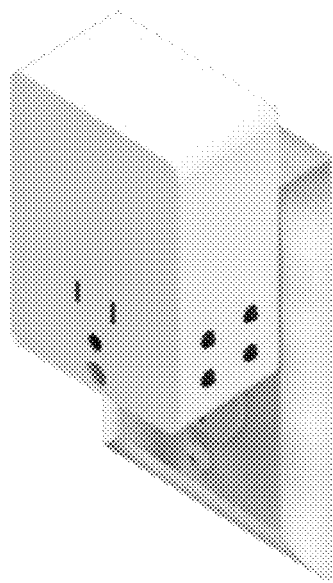
FIG. 3 shows an exemplary electronic device as a plug-in unit.
Figure 4:
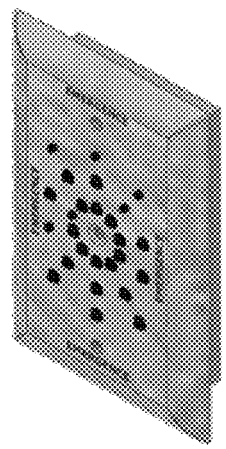
FIG. 4 shows an exemplary electronic device as a flush wall-mount unit.
Figure 5:
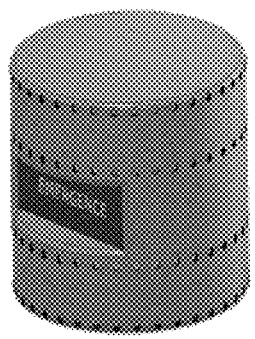
FIG. 5 shows an exemplary electronic device as a table top version unit.
Figure 6:
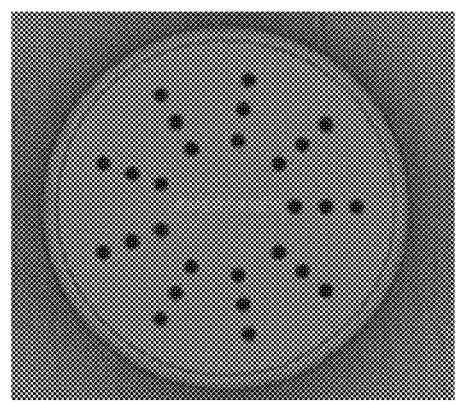
FIG. 6 shows an exemplary electronic device as an auxiliary unit.
Figure 7:
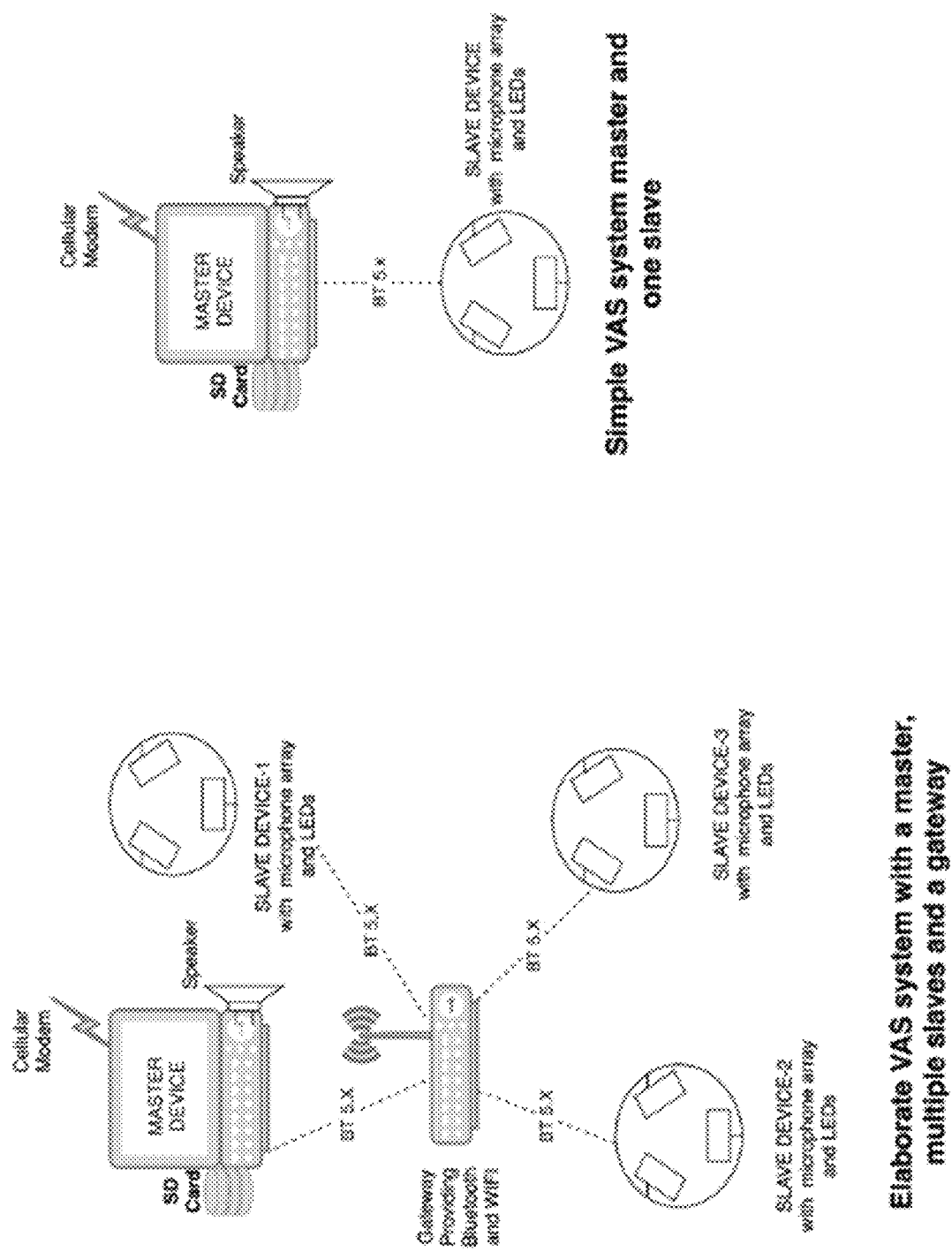
FIG. 7 shows a schematic diagram of the security system.
Figure 8:
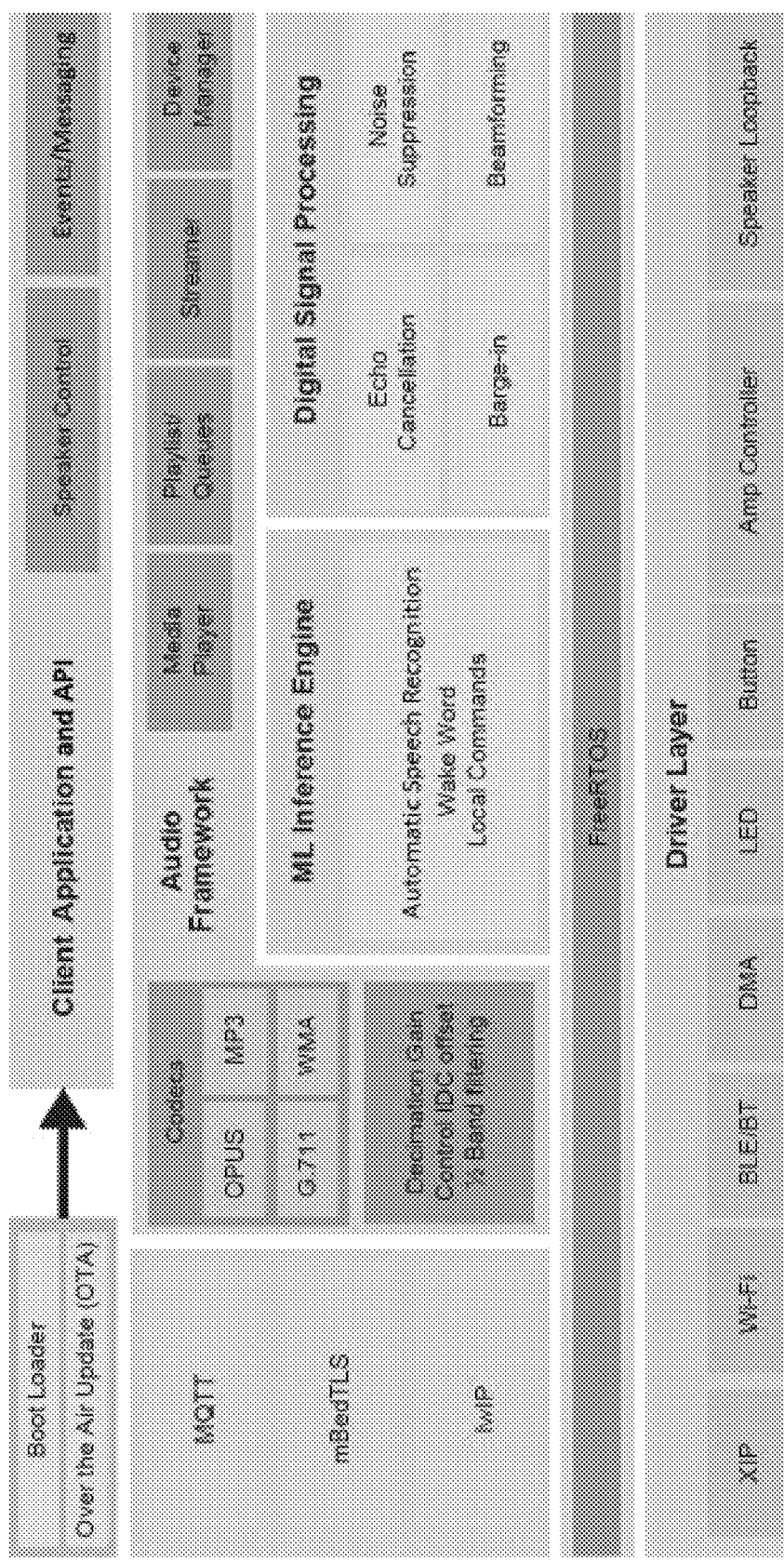
FIG. 8 shows an exemplary embodiment of embedded High Level Software Architecture.

The present invention generally relates to an electronic device for used in a security system, a security system including the electronic device and methods for activating an automatic predetermined response measure employing the electronic device in an emergency situation. The device can be employed in an emergency situation (e.g. a mugging, robbery, injury, automobile accident, school shooting, and so forth) where the user is unable to access or use a mobile device in the manner to notify or alert others to the emergency. In such a case, it is desirable to have a security device and/or system capable of notifying a third party of the emergency in a safe and efficient manner Further, in certain emergency situations, the user may be incapacitated and unable to answer questions. The electronic device of the present invention is capable of storing information such that the user may create a profile that includes personal information which can be transmitted to the third party. In addition, the electronic device may be capable of collecting information, such as auditory, visual, and biometric data from one or more sensors and streaming and/or transmitting the collected data to the third party as well.

In certain types of emergency situations, the device is capable of notifying a third party without drawing the attention of a potential perpetrator.

In one aspect, the invention relates to an electronic device configured to connect to a network or interconnected environment via, for example, Bluetooth (BT 5.0), a wireless network, a wired network, and the Internet. In this aspect, the electronic device may be adapted to connect to a mobile device which may act as either a communication device for transmitting data or an additional sensor for gathering data.

The electronic device may include a processor, a SIM card, one or more sensors, a memory and, optionally, stored instructions for execution by the processor. The stored instructions can be provided as part of the device or can be downloaded to the memory of the device in any conventional manner. In one aspect, the instructions cause the processor executing the instructions to identify trusted users, analyze words or phrases spoken by a trusted user using voice recognition, determine if a trusted user has spoken a wake word, activate one or more sensors to collect auditory, visual, and bio-metric data on the electronic device if the one or more trusted user(s) has spoken the wake word, determine location and temporal data for the electronic device, optionally, from the SIM card, determine if a trusted user has spoken a trigger word indicating that the trusted user is in an emergency situation, wherein each trigger word corresponds to one or more predetermined response measure(s); and activate the one or more predetermined response measure(s) on the electronic device if the trusted user has spoken the corresponding trigger word(s).

In one embodiment, the system includes the coordinates of every sensor, thus providing easy identification of each person with their last known location or members within a programmed group, for example, a family within a home.

In a second embodiment, the present invention relates to a security system comprising a master device including one or more processors, a cellular modem, a SIM card, a GPS chip, and one or more sensors, and one or more of the above-mentioned electronic devices, wherein the one or more electronic devices are one or more slave electronic devices to the master device and each of the one or more electronic devices are in bidirectional communication with the master device.

In the foregoing embodiment, the security system, when there are at least three or more slave electronic devices, also includes a gateway in communication with the master device and each of the at least three or more slave electronic devices.

In a third embodiment, the present invention relates to a method for activating a response measure in a security system comprising one or more of the electronic devices.

The Electronic Device

The electronic device of the present invention may include a processor, a SIM card, one or more sensors, and memory for storing instructions. The processor is adapted for executing the instructions to analyze words or phrases spoken by a trusted user using voice recognition; determine if the trusted user has spoken a wake word from the analyzed words or phrases. Upon recognition of the wake word having been spoken by a trusted user, one or more sensors are activated to collect auditory, visual and/or bio-metric data on the electronic device. The electronic device may also determine location and temporal data for the electronic device. Once the electronic device determines that the trusted user has spoken one or more trigger words, this indicates that the one or more trusted user(s) is in an emergency situation. Each of the one or more trigger words corresponds to one or more predetermined response measure(s). Then, the electronic device will activate the one or more predetermined response measure(s).

In one embodiment, the system is always waiting to hear one or more registered Wake Text dependent words and/or one or more User Registered Wake Words (Text Dependent or Independent) with a minimum library consisting of a few words. The wake word may be preprogrammed and once the user enrolls, the word will be verified to ensure the system's ability to Identify and authenticate both the specific user and wake word. Once the authorized wake word is recognized and identified the system will switch into the mode of waiting to hear a trigger word.

The one or more wake words and the one or more trigger words are stored locally and internally in the secured processor and there is no means to access that data within the local device. The data can be erased, reprogrammed or wiped clean, but is not accessible to third party. One advantage of having both a wake word and a trigger word is to minimize false or inadvertent actuation of a predetermined response.

Preferably, the electronic device of the present invention is a stationary unit which can be placed in every room of a building. The security system will then include one or more of the electronic devices and use them to monitor an entire building. The building may be, for example, an apartment, a house, a commercial building, a school, or other dwelling or place of work.

Alternatively, a trusted user may carry, wear a portable version of the electronic device.

The electronic device may be selected from a plug-in unit, a flush wall-mount unit, a stationary unit, a table top unit and an auxiliary unit. For example, a portable unit can be kept in the living room, and then later taken to the bedroom if needed. The auxiliary unit may be employed when a trusted user desires coverage and security in all rooms. In some embodiments, the auxiliary unit is stationary, wall plug mounted or battery operated.

In some embodiments a slightly larger unit may be situated in open areas, such as parks, trails, colleges, or school campuses replacing the currently existing emergency blue light systems with auxiliary/master devices installed in the lamp posts or any other structure in a nondiscreet manner with a text dependent word or independent word.

Memory

The electronic device includes a memory component, which may include logic, hardware, and the like configured to store information, data, programs, and the like, to be executed by the electronic device. The memory may store, for example, the applications or programs, operating protocols, and the like, as well as a variety of other processing system parameters. The memory component may include a mass storage device and portable storage media. The memory component may be implemented via a magnetic disk drive, an optical disk drive, a solid-state disk drive, and the like. The memory component may be implemented via non-volatile storage device for storing data and instruction.

The memory component may include personal information of one or more trusted users, such as the medical history, the name, the address, the age, allergies, medications, emergency contacts, information about pets, the name and age of, children, parents or other relatives, the number of people currently in the building or that reside or work in the building.

In one embodiment, the memory component may store multiple profiles based on the one or more trusted users. In each of the profiles, the corresponding one or more trusted users may store pre-recorded messages, SMS and/or emails, which may be transmitted to a third party when a predetermined response measure is initiated.

The memory component may include local voice storage, this prevents a trusted user's voice data from being exposed to the cloud or any other unregistered device. The local voice storage additionally allows for user voice enrollment, recognition, and identification. At the time of enrollment, or programming of the system, the local voice storage allows for onboard recording and playback. The system is designed such that the user may access these features on a corresponding phone app, residing, for example, on an Android or iPhone.

The data stored in the memory component may be erased, reprogrammed, or wiped clean.

Wake Word

The memory may include logic or instructions to facilitate programming of the electronic device by the one or more trusted user(s) to recognize and store wake words. For example, if a household includes three people, each individual may assign a different "wake word", which corresponds to an individual trusted user. The electronic device may employ natural language understanding and voice recognition to determine if one of the trusted users vocalized their corresponding wake word to activate the electronic device. This is to avoid a stranger or other non-trusted user from inadvertently activating the electronic device by saying the wake word. Also, because the system will know which trusted user vocalized the wake word, this allows the system to transmit some or all of the personal information of the specific trusted user to a third party once the trigger word is uttered after the wake word.

The electronic unit is powered as a wall unit on a socket, or by a battery, and therefore will not shut down. The electronic unit is designed to operate using extremely low power to save energy and costs and to ensure that the electronic is always on and waiting to hear the wake word. To ensure the privacy of the one or more trusted users, the electronic device remains in this low power mode constantly monitoring for speech, until an assigned wake word is spoken by a trusted user. Once, the wake word has been spoken by a trusted user, the electronic device will activate the one or more sensors to collect auditory, visual, and biometric data, and determine the location and temporal data for the electronic device from the SIM card.

Trigger Word

The memory may include logic or instructions to permit the one or more trusted user(s) to program or store trigger words. For example, if a household includes three people, each individual may assign a different trigger word, which corresponds to an individual trusted user. The electronic device employs natural language understanding and voice recognition to determine if one of the trusted users vocalized a trigger word assigned to that user in order to activate a predetermined response measure. The electronic system will only activate a predetermined response measure if the wake word has been previously recognized, as set forth above. For example, if a first trusted user speaks the wake word and the same or a second trusted user says a trigger word, the system will activate a predetermined response measure. The processor will perform a loop test at all times to check the authenticity of the trusted user during wake initiation and trigger initiation.

Multiple trigger words may be assigned to each trusted user. In such case, each trigger word is preferably assigned to correspond to a specific type of emergency situation (e.g. assault, robbery, injury, fire, and so forth). The predetermined response measure associated with each trigger word may be different so that an appropriate response measure is activated for a particular type of emergency situation. For example, one of the trusted users of the electronic device may program a first trigger word for an emergency situation involving a personal injury. When the trusted user speaks the first trigger word, the electronic device launches a predetermined response measure, such as contacting a third-party. In this case, the third party may include family member(s), friends, and/or a doctor's office, emergency service, e.g. ambulance service, or a hospital. The same trusted user may program a second safe word for an emergency situation involving a crime (e.g. assault or robbery). When the user speaks this second safe word, the electronic device launches a different predetermined response measure suitable for a crime situation, e.g. contacting the local police department. Each trusted user may program any number of trigger words and associated response measures.

Furthermore, the predetermined response measures may optionally include streaming and/or sending the collected information from the one or more sensors, specifically, the collected auditory, visual, bio-metric data, location, temporal data, and the personal information of the one or more trusted users.

In one embodiment, the system may include user guidance. In this embodiment, the user is guided by a voice enrollment process once the unit is powered on. The voice enrollment process may prompt the user to create one or more different trigger words for activating one or more corresponding predetermined responses. These trigger words may be sent to the web portal (the platform that is operated in an encrypted and secured manner) from where the Platform will interact with the necessary links to the Emergency providers such as the 911 etc.

The system may also send/broadcast to recipients programmed into a list to be notified, which list is stored in the system. Initial communication may be by phone or Internet to send a pre-recorded message, sms, email, with location so that help can be dispatched immediately to the location.

SIM Card

The electronic device comprises a SIM card. Preferably, the SIM cards of the present invention are Narrowband-Internet of Things (NB-IoT) SIM cards. Each electronic device has a unique MAC ID, to which each SIM card will have a linked corresponding SIM ID and will be activated upon a trusted user's enrollment.

The SIM cards of the present invention do not rely on any Location Area Identity (LAI) information, as each electronic device is mapped internally with respect to the specific user's location, e.g. home, office, apartment, as the primary method based on the reordered GPS location coordinate from the GPS chip. Optionally, the LAI may be used to improve location information. SIM cards store network state information which is received from the Location Area Identity (LAI). These networks allow for the SIM card to identify the location of an electronic device.

Furthermore, the SIM cards of the present invention may include user enabled inward speech relay.

Sensors

The electronic device includes one or more sensors to gather information indicative of the environmental conditions near each of the electronic devices. The one or more sensors may be selected from a camera, a microphone, a light sensor, a GPS, a gyroscope, an accelerometer, NPN/PNP inputs, and any other suitable sensors for a particular location such as an infrared sensor for detecting heat signatures of humans or animals in the vicinity of an electronic device.

Preferably, each electronic device comprises at least three microphones, or even more, such as preferably at least 6 microphones. This allows for improved audio by enabling the capability of filtering or removing background noise. Preferably, the electronic device is placed at about eye level, e.g. 1-3 or 1.5-2.5 meters above the ground or floor, to capture the best quality audio. The microphone may be enabled for one or more suitable audio profiles such as the Bluetooth 5.0 audio profile. Preferably, the microphone is a far field capable microphone.

The accelerometer may be used to detect a significant change in acceleration of an object.

The NPN/PNP inputs may be used to provide an interface for receiving Wired or Wireless inputs.

One advantage of the present electronic device is that a trusted user can choose to employ the device only for data collection by utterance of a wake word without following up with a trigger word. As such, the device provides a second useful function of collecting data without having to take emergency response measures. Such data can be transmitted to another location for processing and/or storage, as desired by the trusted user, who can program these functions into the electronic device. This function may be useful, for example, in a retail location to monitor shoplifting when someone enters the location and behaves suspiciously.

The electronic device can also be set up to operate in a stealth mode whereby activation of the device by one or both of the trigger words is carried out without creating audio or visual cues to persons in the vicinity of the device. In that manner, only the trusted user would know that the device has been activated to gather data and/or carry out a predetermined response.

Security System

The present invention also relates to a security system comprising a master device, wherein the master device comprises, one or more processors, a cellular modem, a SIM card, a GPS chip, and one or more sensors; and one or more of the electronic devices as described above. In this system, the one or more electronic devices are one or more slave electronic devices to the master device and each of the one or more slave electronic devices are in bidirectional communication with the master device, preferably via Bluetooth or other suitable means.

The one or more slave electronic devices employ a direct authentication method to establish a trust with the master device. In some embodiments, the master device may have a parent-child relationship with each of the one or more slave electronic devices.

The security system optionally employs a MESH network stack to ensure communication between the one or more slave electronic devices.

In one example, the following steps may be followed:
1. The system is installed at a location,
2. One or more trusted users are enrolled in the system including creation of the profiles discussed above.
3. A trusted user programs one or more wake words,
4. A trusted user says a trigger word for a particular situation and programs the predetermined response for that situation.
5. The system verifies the trigger word and authenticates the user,
6. Once verified and authenticated, the programming is acknowledged by a visual indication, (e.g. an LED, audio feedback, etc.) that enrollment was successful,
7. Now the system is ready to monitor for the wake word followed by the trigger word, at which time the system will silently activate the appropriate predetermined response to summon help.

Figure 9:
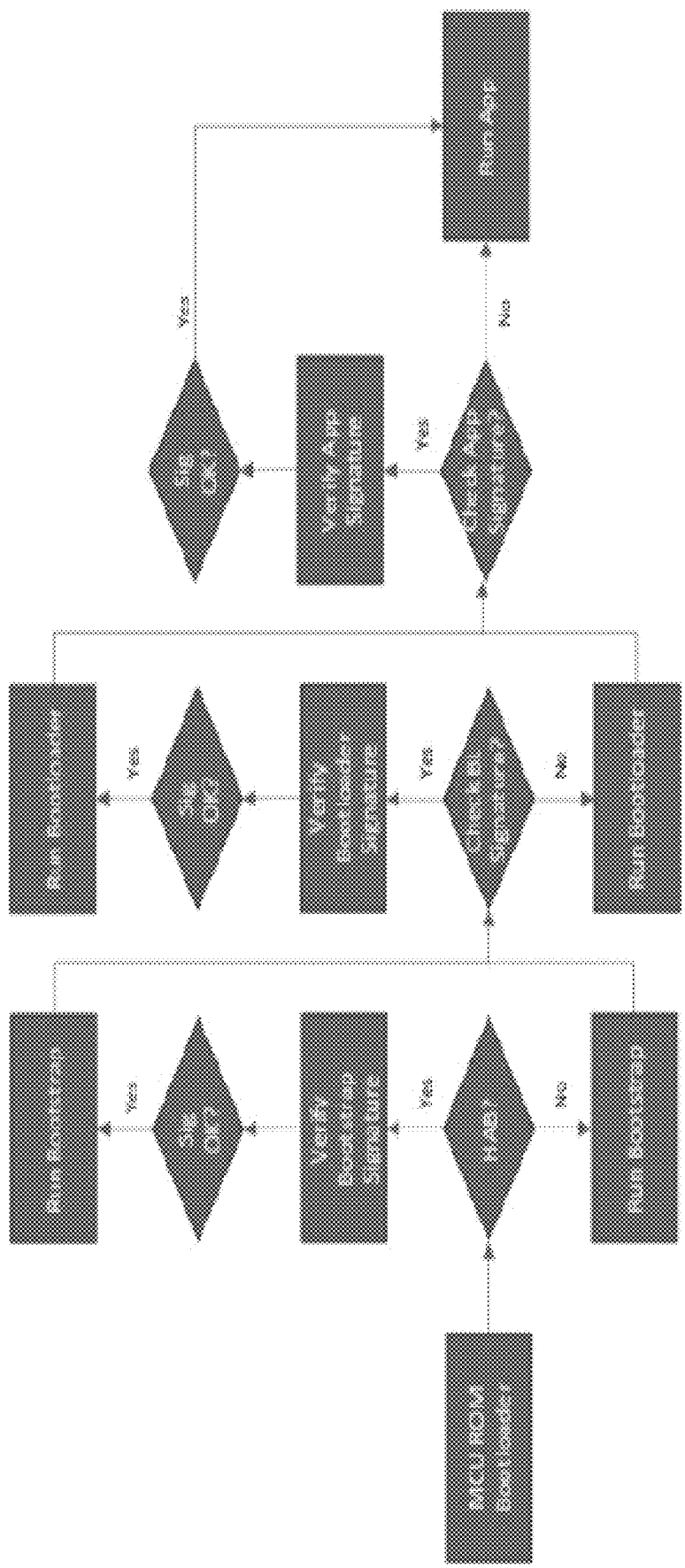
FIG. 9 shows a flowchart of an exemplary embodiment of the Boot Security Flow according to the present invention.
Figure 10:
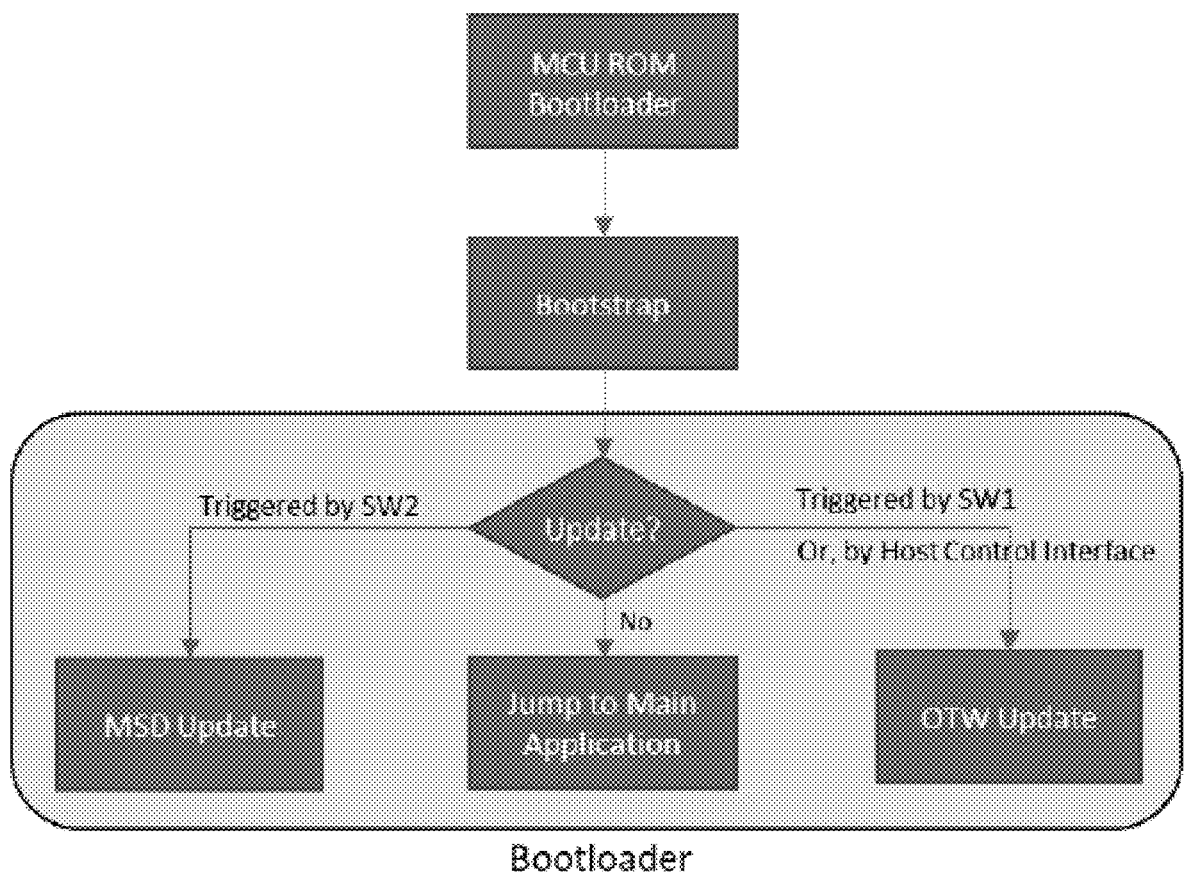
FIG. 10 shows a flowchart of an exemplary embodiment of the bootloader.

The security system may additionally include a Secured Stack for integration with third party devices, such as security devices, like authentication on the Google Cloud, Amazon, Microsoft, or any custom devices or network which enables Transport Layer Security (TLS). Furthermore, the present invention relates to a system which employs a human voice as a "secure Switch". Thus, the present invention provides a secure boot sequence to ensure security. FIGS. 9 and 10 illustrate the secure boot system of the present invention.

In addition, the secured stack system of the present invention provides an option for backward connectivity with the above-mentioned third-party devices. The problem with these devices, is that they do not provide the discretion that the present invention provides. For example, a trusted user may not be able to specifically say, "Hey Alexa/Siri, call 911", as it would be obvious to a potential attacker that the trusted user is attempting to summon help. Therefore, the secured stack integration may allow for a trusted user to say one of the programmed wake words and/or trigger words to cause the electronic devices of the present invention to interact with one of the third-party Smart Speakers, via a remote or wired output with any security device via a wireless link. This is made possible via the application programming interface (API) and/or software secured stack.

In another embodiment, the secured stack system is capable of forward connectivity with one or more of the above-mentioned third-party devices. For example, a trusted user may be able to say specific word to the master device or the one or more electronic devices and "turn on the hot water" or "turn on the lights in the kitchen" via the one or more third-party Smart Speakers, based on authenticated and recognized users only.

The system can alternatively be programmed to provide a confirmatory signal rather than silently activating the appropriate predetermined response. In such case, the confirmatory signal can, for example, be an innocuous response such as a statement of the current time and/or a report of the weather or a simulated reminder notification so that a third party within range of the confirmatory signal does not become suspicious, while the user is informed that the predetermined response has been successfully activated.

The present system not require the presence of a separate security system but instead is a stand-alone system that relies entirely on the capabilities of the system. The system does not rely on a phone or other physical devices to carry out its functions. Rather the only requirement is that a trusted user must be in sufficiently close proximity to the system that it can hear the wake and trigger words.

In some embodiments, the security system includes a cryptographic processor prevent unauthorized devices from connecting to the network.

Master Device

The master device of the present invention includes a processor, a cellular modem, a SIM card, a GPS chip, and one or more sensors.

The master device preferably includes one or more processors, selected from a main processor, a secured authentication and recognition processor, a speech processor, and an audio processor. In some embodiments, the master device includes a main processor, a secured authentication and recognition processor, a speech processor, and an audio processor.

A key feature of the system of the present invention is the inclusion of a cellular modem within the master device. As the master device includes a cellular modem and is in communication with the one or more slave electronic devices, none of the devices are required to be paired with an intermediate device, for example, an Android or iPhone. Thus, the present invention does not require or make use of a phone as its carrier method to transmit and receive communication signals. This allows for a more efficient method than currently existing emergency systems, and it is capable of directly transmitting an emergency signal to a third party or the cloud platform.

In some embodiments, the one or more slave electronic devices include a specific trusted code which is communicated to the secured authentication and recognition processor of the master device, to form a trusted relationship between the one or more slave electronic devices and the master device.

The master device additionally provides each of the one or more slave electronic devices with updates and diagnostics. The master device may be accessible by an app, which may be accessed via an Android or iPhone.

The master device may also include one or more sensors which may be the same as, or different from the one or more sensors as described above. Thus, in one embodiment, the master device may additionally comprise the functionality of an electronic device as described above and thus function as both the master device and one of the electronic devices of the system.

Preferably, the master device is a mobile device which can be carried by a user from room to room within a building.

The master device may be configured to periodically transmit its location data collected from the GPS chip, for example, every 5 to 60 minutes. The master device typically operates in a sleep mode. One processor of the master device may be linked to an accelerometer to automatically wake the master device when the master device is in motion. When the master device is at rest, wherein at rest is defined as observing no continuous acceleration, for example, over 5 minutes, the system may transmit the location data. In contrast, in the case of actuation by a trigger word spoken to one of the electronic devices, the master unit may update and transmit its location more frequently, for example, every 5 seconds until the triggered alarm is acknowledged or the battery wears out.

The battery is preferably configured to work for at least 6 hours of continuous operation, once the master unit is triggered to provide a predetermined response, based on the assumption that the master device updates about every 10 seconds in this mode.

The security system may employ additional methods for improving the location accuracy by making available one or more other wide area augmentation services as deemed fit, or by accepting and processing updates. The GPS module may be capable of using many or all versions of GPS satellite constellation available in the world, including, but not limited to, USA, Russian, European, Japanese, Chinese and Indian constellations.

The master device optionally includes a SD card.

Gateway

The security system of the present invention preferably includes a gateway when 3 or more slave electronic devices are employed. The gateway is in communication with the master device and each of the one or more slave electronic devices.

The gateway is configured to manage the master device and the three or more slave electronic devices. The gateway is provided to prevent unauthorized devices from connecting to the network by means of a secured cryptographic processor.

In addition, the gateway collects and transmits diagnostic information from the master device and three or more slave devices, monitors the signal strength of each of the master and three or more slave devices, and provides a location ID of each of the devices.

In some embodiments, the gateway is capable of carrying out over the air (OTA) system updates and diagnostics for the three or more slave units and the master device.

The gateway, master device, and three or more slave electronic devices may communicate via Bluetooth and/or WIFI. In some embodiments, the gateway and the master device may communicate via WIFI, Internet Protocols, and/or cellular communication to contact third parties.

The Method

Referring now to FIG. 1, shown therein is an exemplary method implementing certain aspects of the present invention. Provided is a method of monitoring for, and responding to, an emergency situation. The method may include analyzing words or phrases spoken by a trusted user, using natural language and voice recognition. The method includes listening for one of the trusted users to speak the wake word. In the method, recognition of a wake word spoken by a trusted user activates one or more additional functions of the electronic device such as a variety of data collection functions as described above. The method also includes a step of collecting data via the one or more sensors once the electronic device is activated as a result of recognition of the wake word. The method may then include a step of listening for one of the trusted users to speak a trigger word that indicates that the trusted user is in an emergency situation. The method also includes a step of activating one or more predetermined response measures by the electronic device once the device recognizes that the user has spoken the trigger word. Typical response measures may include contacting a third party directly, without the involvement of a mobile device such as a mobile phone, and/or transmitting collected data to the same third party or a different third party. The time stamp and location obtained from the SIM card would typically also be transmitted to the third party as part of the predetermined response.

FIG. 9 shows a series of checks that the system will perform at the time of boot time. There are configuration options in the various applications (ROM bootloader, bootstrap, bootloader), which will determine which sequence is followed. By default, the security features are disabled. The first time the system is initiated, the user will be asked whether to enable high assurance boot (HAB). If the signature fails at boot when HAB is enabled, the boot process will stop.

As shown in FIG. 9, the bootloader will have to make a decision from three options, which will be available to the bootloader to execute. FIG. 10 shows a flowchart of the boot loader, wherein OTW stands for Over the Wire Update, MSD stands for Mass Storage Device, MCU stands for Microcontroller Update, and SW1 or SW2 stands for Switch or Input.

The secure boot provides a secure element based secure boot which helps using a small microcontroller, IP protection, firmware validations, and provides immutable public key. Also, it is capable of isolating key and certificate manipulations, software, end users, manufacturing equipment, and manufacturing operators.

Figure 11:
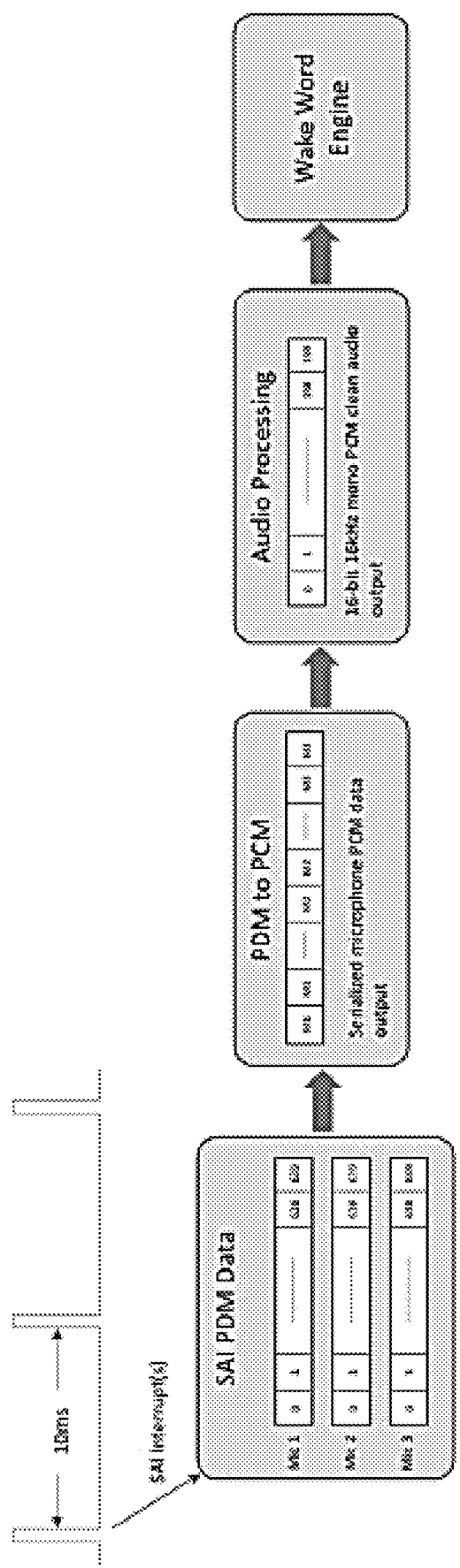
FIG. 11 shows a flowchart of an exemplary embodiment of the audio pipeline architecture.
Figure 12:
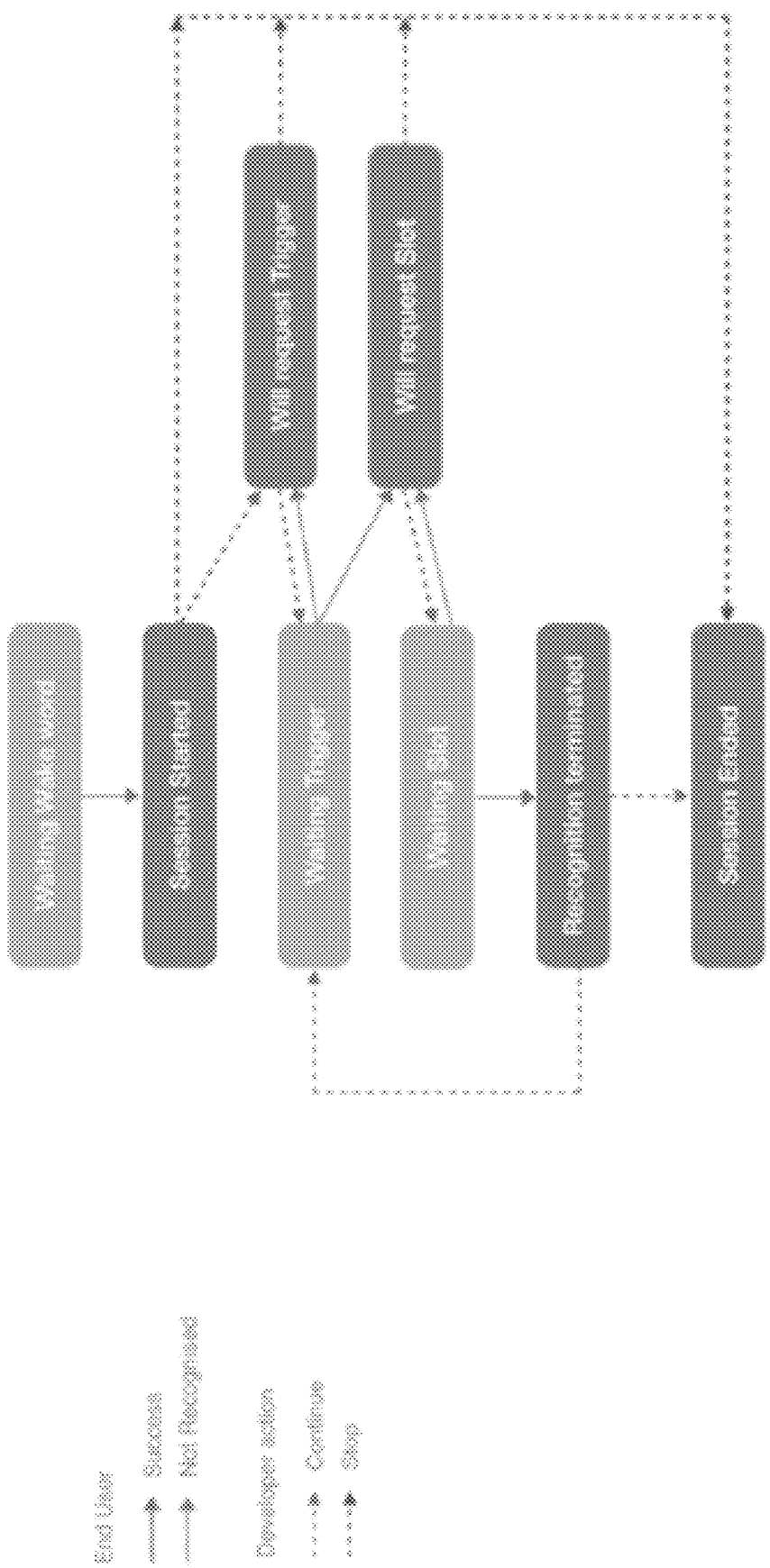
FIG. 12 shows a flowchart of an exemplary embodiment of the processing for automatic speech recognition.
Figure 14:
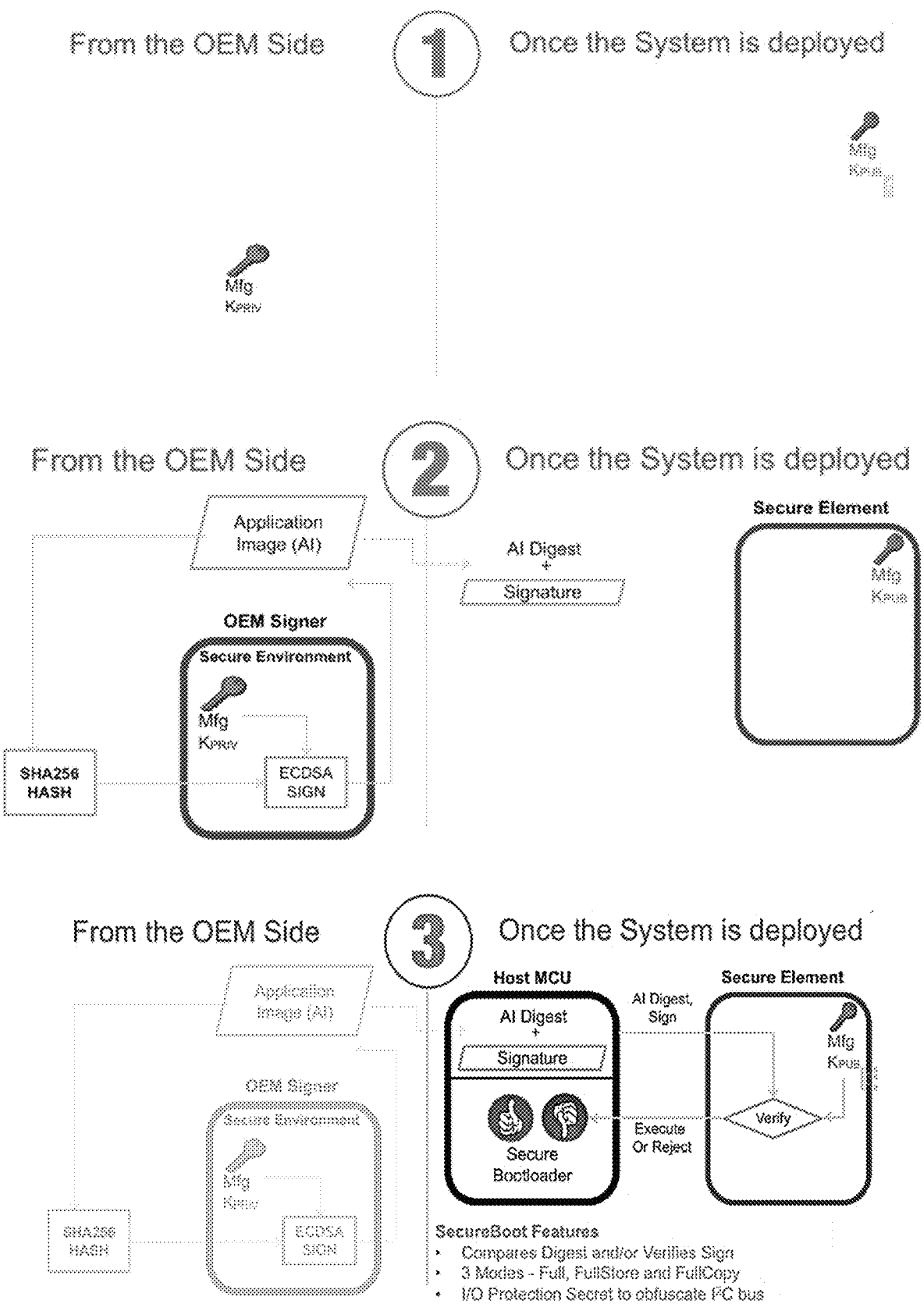
FIG. 14 shows a flowchart of an exemplary embodiment of the secure boot.

FIG. 11 shows a flowchart of an exemplary embodiment of the architecture of the audio pipeline. The audio capture application is implemented as a pipeline. The application is configured to capture three microphones, as preferably, each electronic device comprises of three microphones. Since the microcontroller or processor has so much processing power, the core is used to process the entire chain from pulse density modulation (PDM), decimation to the automatic speech recognition (ASR) engine. Every 10 milliseconds, the DMA moves raw PDM data from each of the microphones. This data is then fed into the microcontrollers. The PDM decimation software IP then converts the audio into 16-bit 16 kHz PCM data. Once it comes out of the decimation block, it is then fed to the audio front end (AFE) to perform noise suppression, beam forming, and acoustic echo cancellation. At this point, it is a single 16-bit 16 kHz mono audio signal.

The foregoing description of the invention has been presented for the purpose of illustration and description only and is not to be construed as limiting the scope of the invention in any way. The scope of the invention is to be determined from the claims appended hereto.

What is claimed is:

1. A security system comprising:
a master device including,
one or more processors,
a cellular modem, one or more non-cellular radios, or combinations thereof;
a SIM card configured for providing temporal and location data,
a GPS chip, and
one or more sensors, and
one or more electronic devices, each said electronic device including:
one or more sensors; and
a memory for storing logic for execution by the processor to:
analyze words or phrases spoken by one or more trusted user(s) using voice recognition;
determine from the analyzed words or phrases if the one or more trusted user(s) has spoken a wake word,
activate the one or more sensors to collect auditory, visual, and/or bio-metric data received by the one or more sensors of the electronic device when it has been determined that one said trusted user has spoken the wake word;
continue to analyze words or phrases spoken by one or more trusted user(s) using voice recognition;
determine if one said trusted user has spoken one or more trigger words from the analyzed words or phrases; and
communicate with the master device to activate one or more response measure(s) if it is determined that one said trusted user has spoken one said trigger word, wherein the one or more electronic devices are configured as slave electronic devices to the master device, the one or more slave electronic devices employ a direct authentication method to establish a trust with the master device and each of the one or more slave electronic devices are in bidirectional communication with the master device by using the cellular modem, the one or more non-cellular radios, or a combination thereof.

2. The security system of claim 1, wherein the one or more processors may comprise a main processor, a secured authentication and recognition processor, a speech processor, and an audio processor.

3. The security system of claim 1, wherein master device is configured to be a mobile device and the one or more sensors comprises an accelerometer.

4. The security system of claim 1, wherein the system comprises at least three or more slave electronic devices and further comprises a gateway in communication with the master device and each of the at least three or more slave electronic devices.

5. The security system of claim 1, wherein the system further comprises a secured cryptographic processor.

6. The security system of claim 1, wherein the one or more sensors of the master device is a far field capable microphone.

7. The electronic device of claim 1, wherein the memory for storing logic for execution by the processor further comprises enrollment, recognition, and identification information of the trusted user.

8. The electronic device of claim 1, wherein the electronic device is configured to directly transmit an emergency signal to a third party or a cloud platform.

9. The security system of claim 1, further comprising a secured stack for integration with third party devices.

10. A method for activating a response measure using a security system, wherein the security system comprises:
  a master device including:
    a processor;
    a cellular modem or one or more non-cellular radios, or a combination thereof;
    a SIM card configured for providing temporal and location data; and
    a GPS chip; and
  one or more electronic devices, each said electronic device including:
    one or more sensors; and
    a memory for storing logic for execution by the processor to perform the method, said method comprising steps of:
      analyzing words or phrases spoken by one or more trusted user(s) using voice recognition;
      determining from the analyzed words or phrases if the one said trusted user has spoken a wake word;
      activating the one or more sensors to collect auditory and/or visual data received by the one or more sensors when it has been determined that one said trusted user has spoken the wake word;
      determining location and temporal data for a component of the system using the SIM card;
      continuing to analyze words or phrases spoken by one or more trusted user(s) using voice recognition;
      determining if one said trusted user has spoken one or more trigger words from the analyzed words or phrases; and
      activating the one or more response measure(s) if it is determined that one said trusted user has spoken one said trigger word; and
  wherein the one or more electronic devices are configured as slave electronic devices to the master device, the one or more slave electronic devices employ a direct authentication method to establish a trust with the master device and each of the one or more slave electronic devices are in bidirectional communication with the master device by using the cellular modem, the one or more non-cellular radios, or a combination thereof.

11. The method of claim 10, wherein the memory is configured to store personal information of each of the one or more trusted users and one or more of said response measures includes a step of accessing and transmitting at least some of said stored personal information of the trusted user that uttered the trigger word.

12. The method of claim 10, wherein the one or more predetermined response measures further comprises streaming and/or transmitting the collected auditory, visual, biometric data, location, temporal data, and the personal information of the one or more users.

13. The method of claim 12, wherein the one or more sensors comprises at least 3 microphones and the method further includes a step of auditory noise reduction.

14. The method of claim 12, further comprising a step of providing an indication to the trusted user that enrollment was successful.

15. The method of claim 10, wherein the processor to connects to a network via Bluetooth, a wireless network, a wired network or the Internet.

16. The method of claim 10, wherein the one or more sensors is selected from a microphone, a camera, a light sensor, a GPS sensor, a gyroscope, an accelerometer, and a motion detector.

* * * * *